United States Patent
Vogel et al.

(10) Patent No.: US 6,528,174 B1
(45) Date of Patent: Mar. 4, 2003

(54) ETHYLENE VINYL ACETATE COMPOSITIONS AND FILM AND METHODS RELATED THERETO

(75) Inventors: Randall Allen Vogel, Wilmington, DE (US); George L. K. Hoh, Wilmington, DE (US); Alok Shekhar, Greensboro, NC (US)

(73) Assignee: E. I. du Pont de Nemours & Co., Wilmington, DE (US)

( * ) Notice: Subject to any disclaimer, the term of this patent is extended or adjusted under 35 U.S.C. 154(b) by 0 days.

(21) Appl. No.: 09/269,825

(22) PCT Filed: Oct. 3, 1997

(86) PCT No.: PCT/US97/18375

§ 371 (c)(1),
(2), (4) Date: Apr. 1, 1999

(87) PCT Pub. No.: WO98/14512

PCT Pub. Date: Apr. 9, 1998

Related U.S. Application Data

(60) Provisional application No. 60/028,063, filed on Oct. 4, 1996.

(51) Int. Cl.$^7$ ................................................ B32B 27/30
(52) U.S. Cl. ............. 428/520; 264/173.19; 156/244.11; 427/355
(58) Field of Search ................................. 428/515, 520, 428/518; 524/229; 264/514, 173.15, 173.19, 209.5, 290.2; 156/244.11; 427/355

(56) References Cited

U.S. PATENT DOCUMENTS

| | | | | |
|---|---|---|---|---|
| 2,495,286 A | | 1/1950 | Brubaker | 260/63 |
| 3,645,822 A | | 2/1972 | Widiger et al. | 156/243 |
| 3,734,798 A | * | 5/1973 | Dooley | 156/308 |
| 3,780,140 A | | 12/1973 | Hammer | 260/884 |
| 3,879,330 A | | 4/1975 | Lustig | 260/31.8 M |
| 4,394,473 A | | 7/1983 | Winter et al. | 524/226 |
| 4,510,281 A | | 4/1985 | Smith | 524/229 |
| 4,517,242 A | | 5/1985 | Sinha et al. | 428/336 |
| RE32,325 E | * | 1/1987 | Smith | 524/229 |
| 4,956,232 A | | 9/1990 | Balloni et al. | 428/349 |
| 5,399,401 A | | 3/1995 | Powell | 428/36.9 |
| 5,403,668 A | * | 4/1995 | Wilhoit | 428/500 |
| 5,453,209 A | | 9/1995 | Simon | 252/18 |
| 5,468,444 A | | 11/1995 | Yazaki et al. | 264/566 |

FOREIGN PATENT DOCUMENTS

GB  2289281  11/1995

* cited by examiner

Primary Examiner—D. Lawrence Tarazano
(74) Attorney, Agent, or Firm—Kevin S. Dobson

(57) ABSTRACT

The present invention relates to film-forming compositions containing ethylene vinyl acetate copolymers with a vinyl acetate percentage that causes film-forming problems and processability problems and an alkylene bisoleamide which is used to enhance the film forming capabilities of theses high VA content resins. The invention also relates to films prepared from theses compositions and to coating compositions.

10 Claims, No Drawings

ETHYLENE VINYL ACETATE COMPOSITIONS AND FILM AND METHODS RELATED THERETO

This application claims the benefit of No. 60/028,063 filed Oct. 4, 1996.

BACKGROUND OF THE INVENTION

1. Field of the Invention

The present invention relates to certain polymeric blends containing olefinic bisoleamides such as EBO (N,N-ethyleneBisOleamide) and ethylene copolymers such as ethylene vinyl acetate (EVA). The composition provides enhanced film forming properties in the production of monolayer or multilayer film products.

2. Description of Related Art

Ethylene vinyl acetate copolymers (EVA) are known and have a wide variety of applications in the industrial arts. EVA copolymers find commercial use in flexible, heat sealable, functional, and decorative hot-melt and solvent-applied coatings; as wax additives to impart toughness, flexibility, and adhesion; as blending resins to impart flexibility to brittle materials; and as a component of hot-melt and solvent-applied adhesives. It is also known that the vinyl acetate percentage in these copolymers can be varied and many such resins are sold under the trademark ELVAX® by E. I. du Pont de Nemours and Company. The present inventors have found that the film forming properties and processibility of this resin can vary with increasing vinyl acetate percentage and that high vinyl acetate copolymers (e.g. greater than about 0% VA by weight) can cause film processing problems. In an effort to solve this problem for high VA content ethylene copolymers, the inventors have surprisingly found that the addition of EBO improves film forming capability while minimizing negative effects on film properties such as clarity or other required physical parameters.

U.S. Pat. No. 4,510,281 describes the combination of EVA copolymers with certain oleamides to provide tack free pellets for industrial end uses. The oleamides and other esters described therein as additives improve the free-flowing properties of the pellets by incorporating into the polymer material prior to pelletization about 500–10,000 parts per million (ppm), especially 1000–5000 ppm, based on the polymer weight of an additive selected from the group consisting of N,N'-ethylenebisoleamide, N,N'-ethylenebiserucamide, N,N'-diolelyladipamide, and N,N'-dierucyladipamide. There is no specific teaching in this reference of the use of the compositions therein to produce a film or a film having processing advantages. There is, however, a general teaching relating to improvement of the handling and packaging throughput in actual production as a way to monitor good slip properties or antiblocking properties, especially for higher vinyl acetate content copolymers which could not be assessed by standard stick temperature tests. There is no requirement in the present invention that the additive be incorporated into the ethylene copolymer resin before pelletization.

Grades of ELVAX® containing, for example, N,N-ethylenebisoleamide have been sold by E. I. du Pont de Nemours and Company for industrial applications but have not been sold or used as packaging grade or film-forming resins. Grades of ELVAX® resins not containing an additive of this nature have been sold into the packaging market.

U.S. Pat. No. 4,956,232 discloses the use of slip additives in multilayer polypropylene films. Slip additives which may be used in making the films disclosed in the U.S. Pat. No. 4,956,232 patent are those which are incompatible with polypropylene, i.e., those which bloom to the surface from the core and skin layers. Non-ionic surfactants, such as the amides and carboxylic acids, were of particularly interest in this patent disclosure. Amides which were preferred included amides of carboxylic acids having at least five carbon atoms, for example, behenamide, linolenamide, arachidamide, ricinol-amide, palmitamide, myristamide, linoleamide, lauramide, capramide, perlargonamide, caprylamide, oleamide, steramide, N,N'-ethylene bisoleamide, and the most preferred slip additive, erucamide. Carboxylic acids which were also described as useful included those having at least four carbon atoms, for example, butyric, caproic, caprylic, capric, lauric, lauroleic, myristic, myristoleic, pentadecanoic, palmitic, palmitoleic, margaric, stearic, oleic, linoleic, linolenic, ricinoleic, 2,3-dihydroxystearic, 12-hydroxystearic, behenic, eleostearic, arachidic, 2-ecosenoic, 4-eicosadienoic, 2-docosenoic, 2-tetracosenoic, 2,4,6-tetracosatrienoic and the like.

The slip additive in the above patent disclosure was preferably dry blended together with the polypropylene resin of layer (B) or the heat-sealable resin of layer (A) and then melt mixed. Alternatively, the additive could be incorporated into a minor portion of the resin as a master batch to form a high concentration mix of the additive and the resin. This could then be diluted to the appropriate proportion by the addition of more resin. There is no teaching herein of the use of any of these additives with an EVA resin or film.

U.S. Pat. No. 4,517,242 discloses a combination of ethylene copolymer resins and lubricating agents such as ethylenebisoleamides in glass coating compositions.

U.S. Pat. No. 3,879,330 discloses food wrap consisting of a vinylidene chloride polymer and a thermoplastic urethane polymer. The food wrap films of the invention can contain conventional additives such as lubricating additives, anti-blocking agents, anti-cling agents, and the like, all of which are known in the art. To illustrate, the food wrap films of the invention typically contain up to about 3 weight percent diatomaceous earth as an anti-blocking agent and up to about 2 weight percent of ethylenebisoleamide as a slip agent.

U.S. Pat. No. 5,468,444, describes the production of oriented thermoplastic films by blown-film extrusion. U.S. Pat. No. 5,453,209 discloses chemical metal and oil treating compositions and processes related thereto. U.S. Pat. No. 4,394,473 discloses polybutadiene bags and films. U.S. Pat. No. 3,645,822 discloses a method for providing multilayer films having improved slip properties. U.S. Pat. No. 5,468,444 discloses film-forming thermoplastic resins containing lubricants selected from aliphatic alcohol fatty acid esters obtained from an aliphatic alcohol having 1 to 12 carbon atoms, and preferably 1 to 6 carbon atoms, and a fatty acid having 10 to 22 carbon atoms, and preferably 12 to 18 carbon atoms, such as glycerol monooleate, glycerol di- or trioleate, glycerol triricinoleate, glycerol acetylricinoleate, methyl acetylricinoleate, ethyl acetylricinoleate, butyl acetylricinoleate, propylene glycol oleate, propylene glycol laurate, pentaerythritol oleate, polyethylene glycol oleate, polypropylene glycol oleate, polyoxyethylene glycerol, polyoxypropylene glycerol, sorbitan oleate, sorbitan laurate, polyethylene glycol sorbitan oleate, and polyethylene glycol sorbitan laurate; polyalkylene ether polyols, such as polyethylene glycol and polypropylene glycol; sugar fatty acid esters, epoxidized soybean oil, polyoxyethylene alkylamine fatty acid esters, polyoxyethylene alkylphenyl ethers; higher fatty acid amides having 12 to 22 carbon atoms, such as oleamide, stearamide, and erucamide; ethylene-bis-stearamide, ethylene-bisoleamide, polyethylene wax, polypropylene wax, and liquid paraffin. Suitable nucleating agents include inorganic substances, such as talc and silica. Suitable tackifiers include castor oil derivatives, low-molecular viscous polybutylene, sorbitan higher fatty acid esters, terpene resins, and petroleum resin.

BRIEF SUMMARY OF THE INVENTION

The present invention relates to a polymeric film forming composition comprising an ethylene copolymer selected from an ethylene copolymer and an olefinic bisoleamide selected from an oleamide which affects film-forming properties of high ester content ethylene copolymer resins which heretofore have not produced film with the requisite physical properties. The present invention relates to a film-forming composition consisting essentially of an ethylene copolymer having a percentage of vinyl acetate monomer incorporated at 10% wt or higher relative to the ethylene, and an olefinic bisoleamide of the formula described herein wherein the oleamide additive is not required to be added to the composition prior to pelletization of the ethylene copolymer. The percentage of bisoleamide necessary to have the beneficial physical properties varies with the percentage of vinyl acetate in the film or extrusion coating and depends upon the thickness of the film or coating. Upon reading this disclosure, one of ordinary skill in the art can readily adjust the percentages accordingly.

The present invention also relates to a coating composition for extrusion coating comprising an ethylene copolymer having ethylene and an ester containing monomer (e.g. vinyl acetate or C1–C6 alkyl acrylate esters) and a bisoleamide of the formula described herein wherein the oleamide is not added to the composition prior to pelletization. The bisoleamide may be added post-pelletization and pre-extrusion.

The present invention also comprises a film having a first layer wherein the layer contains a polymeric composition comprising an ethylene copolymer selected from a copolymer of ethylene and a vinyl ester including vinyl acetate and an olefinic bisoleamide selected from a compound of the formula R—C(O)—NHC$_2$H$_4$NHC(O)—R wherein R is selected from a C$_4$–C$_{25}$ saturated or unsaturated hydrocarbon. The invention also comprises a film having a first layer which contains a polymeric composition comprising an ethylene copolymer selected from a copolymer of ethylene and a vinyl ester including vinyl acetate and an olefinic bisoleamide selected from a compound of the formula R—C(O)—NHC$_2$H$_4$NHC(O)—R wherein R is selected from a C$_4$–C$_{25}$ saturated or unsaturated hydrocarbon and a second layer comprising an ethylene acid ionomer selected from copolymers of ethylene and acrylic acid or methacrylic acid which are neutralized with a metal hydroxide or salt wherein the metal includes sodium, magnesium, calcium, etc. Such ionomers are sold under the trademark SURLYN® by E. I. du Pont de Nemours and Company. Any of the film or coating layers may also contain blends of, for example, polyethylene including linear low density polyethylene or ultra low density polyethylene. The relative percentages of the blends depends upon the operator's target parameters and economic or other considerations.

The present invention further relates to a method of enhancing the slip characteristics of ethylene vinyl acetate films comprising adding an additive selected from an olefinic bisoleamide of the formula R—C(O)—NHC$_2$H$_4$NHC(O)—R wherein R is selected from a C$_4$–C$_{25}$ saturated or unsaturated hydrocarbon to an ethylene vinyl acetate copolymer and producing the film. In particular, the bisoleamide permits effective slitting of blown film having a high percentage of vinyl acetate or other ester functionality wherein said film, absent the bisoleamide, would adhere or otherwise stick together to preclude or prevent effective slitting of the two-layer structure coming out of the blown-film pinch rollers. The invention also relates to a process for making a film comprising, (a) blending an olefinic bisoleamide selected from an olefinic bisoleamide of the formula R—C(O)—NHC$_2$H$_4$NHC(O)—R wherein R is selected from a C$_4$–C$_{25}$ saturated or unsaturated hydrocarbon with an ethylene copolymer selected from copolymers having ethylene and an ester containing monomer including vinyl acetate to form a blend and (b) forming a film or extrusion coating from the blend having at least one layer.

The present invention improves the separation of film layers in blown film, both in the separation of the film "layflat" after the blown film stalk is pressed together or nipped which collapses the hollow film stalk upon itself or in subsequent separation of the layers of film on a film roll. In the former separation, the cylindrical hollow film stalk such as from a spiral blown film die, is flattened and collapsed between two moving nip rolls which flatten and press the cylindrical hollow film stalk into a two layer "layflat" sandwich. This film tube is cut at the edges and separated into two film layers, each of which are rolled onto a core forming rolls of film. The layflat is difficult to separate into the separate film layers, especially as the vinyl acetate monomer concentration increases in the ethylene copolymer resin that the film is made from. In the latter case of film layers on a roll, layers of film which have been wound onto a core or roll may be difficult to separate since the layers tend to stick together, again especially as the vinyl acetate monomer concentration increases in the ethylene copolymer resin that the film is made from. In both cases, the N,N'-ethylenebisoleamide surface effects of reducing tackiness and improving film slip (increasing) properties occurs fast enough to allow separation of the film layers and therefore successful operation of these type processes.

The present invention also improves film cutting or slitting in film fabrication processes. The surface effects of the N,N'-ethylenebisoleamide on the film occurs fast enough so that film cutting is often improved. Without the olefinic bisoleamide, the device which cuts the film such as a sharp razor, often catches on the film due to its tacky nature and poor slip qualities and results in the film jumping off the cutter or stretching of the film. Due to the quick action of reducing film tackiness and improving slip properties, in line film cutting is significantly improved with less drag forces between the cutting device and the film.

DETAILED DESCRIPTION

As summarized above, the present invention relates to ethylene copolymeric film-forming compositions containing an additive selected from an olefinic bisoleamide. The additive surprisingly provides enhanced film forming properties to an ethylene copolymer having a percentage of vinyl acetate monomer incorporated at 10 wt % or higher without impacting in a negative manner other film parameters such as clarity.

It has now been discovered that the film-forming and processing properties of polymers selected from the group consisting of
  (a) copolymers of ethylene with an ester containing monomer such as vinyl acetate containing about 10–40 weight percent of vinyl acetate or ester containing monomer, or (b) terpolymers of ethylene with vinyl acetate and carbon monoxide containing about 20–40 weight percent of vinyl acetate and 3–12 weight percent of carbon monoxide can be significantly improved by incorporating into the polymer material about 500–10,000 parts per million (ppm), especially 500–5000 ppm, based on the polymer weight of an additive selected from the group consisting of N,N'-ethylenebisoleamide, N,N'-ethylenebiserucamide, N,N'-diolelyladipamide, and N,N'-dierucyladipamide. For the purpose of this invention (the term "oleyl" means cis-9-octadecenyl, $C_8H_{17}CH=CH(CH_2)_7CH_2—$; and the term "erucyl" means cis-13-docosenyl, $CH_8H_{17}CH=CH(CH_2)_{11}CH_2—$. This nomenclature is generally used in the trade, for example, for oleyl alcohol, oleylamine, and erucylamine.

Polymeric Film Forming Compositions
Ethylene Copolymers

The ethylene copolymers of the present invention are selected from (a) copolymers of ethylene with vinyl acetate containing about 10–40 weight percent of vinyl acetate, or (b) terpolymers of ethylene with vinyl acetate and carbon monoxide containing about 20–40 weight percent of vinyl acetate and 3–12 weight percent of carbon monoxide. These copolymers are generally available under the trade names ELVAX® or ELVALOY® as sold by E. I. du Pont de Nemours and Company and are generally prepared from ethylene and various percentages of vinyl acetate and, if necessary, carbon monoxide; or (c) copolymers of ethylene with ester containing monomers selected from methyl acrylate, butyl acrylate, isobutyl acrylate or terpolymers containing carbon monoxide.

The preferred ethylene copolymers are selected from ethylene vinyl acetate copolymers having a vinyl acetate percentage by weight relative to the ethylene in the range of 15–40 wt. % The most preferred ethylene vinyl acetate copolymer utilized in the film forming composition is selected from 15–33 wt. % or as exemplified herein.

For the purpose of this invention, the term "vinyl acetate copolymer" includes both the dipolymers and the terpolymers of ethylene with vinyl acetate and with carbon monoxide. Most commercial EVA dipolymers contain about 2–55% by weight of vinyl acetate. Terpolymers of ethylene with vinyl acetate and with carbon monoxide may contain about 18–40 weight percent of vinyl acetate and 2–12 weight percent of carbon monoxide. Dipolymers of ethylene with vinyl acetate are available, e.g., from E. I. du Pont de Nemours and Company, Wilmington, Del., under the trademark Elvax®; the terpolymers with carbon monoxide can be made according to the teachings of U.S. Pat. No. 2,495,286 to Brubaker and U.S. Pat. No. 3,780,140 to Hammer. As the vinyl acetate content of the copolymer increases, the copolymer tends to become increasingly sticky in both film and pellet states.

As discussed above, while use of the bisoleamides for antiblocking purposes is known, however, high VA content EVA copolymers are generally not used to produce film. The present inventors have discovered that the EVA copolymers with between 10–40% VA content can produce film with good properties provided that an olefinic bisoleamide is present in the composition as a primary additive.

Primary Additives

The olefinic bisoleamides are generally selected from a compound of the formula: R—C(O)—NHCH$_2$CH$_2$NHC(O)—R wherein R is selected from $C_4$–$C_{25}$ saturated or unsaturated hydrocarbon moieties. In particular, the olefinic bisoleamides are selected from the group consisting of N,N'-ethylenebisoleamide, N,N'-ethylenebiserucamide, N,N'-diolelyladipamide, and N,N'-dierucyladipamide. The amides of this invention can be added to the copolymers by any convenient technique, for example, in the melt, as a dry powder below its melting temperature, or as a concentrate in the same or any compatible polymer. The additive is thoroughly blended with the polymer, which is then used to produce (via extrusion) the film or coating of the present invention.

The preferred olefinic bisoleamide is selected from N,N-ethyleneBisOleamide (EBO). N,N'-Ethylenebisoleamide is available commercially from Carstab Corp. in Reading, Ohio, under the name "Advawax" 240; from Humko Sheffield Co., Memphis, Tenn., under the name "Kemamide" W-20; and from Glyco Chemical Co., Greenwich, Conn. under the name "Glycolube" VL. The commercial product has a melting range of 113°–118° C. It is recommended by its manufacturers as processing lubricant and antiblocking agent for various polymers and copolymers, especially as a slip agent for films. Its recommended level for these uses is 0.5–2%. As discussed above, however, there is no recommended use known for processing this additive with high VA content resins for film. The other additives can be made by known methods from readily available materials. Thus, N,N'-ethylenebiserucamide is made by heating 1,2-ethylenediamine with erucic acid, and the remaining two amides are made by beating either adipic acid or its dimethyl ester with at least two equivalents of either oleylamine or erucylamine. The adipamide thus has the formula RNH—C(O)—(CH$_2$)$_4$—C(O)—NHR where R is either the oleyl or the erucyl group.

The relative weight percentage of olefinic bisoleamide to the ethylene copolymer ranges from 200–10,000 ppm. As indicated above, the percentage of bisoleamide will vary depending upon other parameters including VA content and thickness of the film or coating. In an 18 wt. % VA film, 1,000–3,000 ppm is the preferred range. In a 12 wt. % VA film, 700 ppm provides good slitting properties.

Additional Excipients

Additional excipients which are normally added to film forming or extrusion coating compositions include antiblock agents, fillers and other excipients known to those of ordinary skill in the art. As stated above, these additional ingredients can include other polymers, etc., including polyethylenes or ethylene copolymer ionomers such as those ionomers sold under the trademark SURLYN® by E. I. DuPont de Nemours and Company in additional or adjacent layers.

The film forming composition is prepared by mixing the olefinic bisoleamide with the ethylene copolymer as described below in a blown film forming process.

Film
Blown Film Forming Process

The vinyl acetate and ethylene copolymer resin, either containing the N,N'-ethylene bis oleamide or mixed with pellets containing the N,N'ethylene bis oleamide component, is conveyed to the feedthroat of an extruder. The extruder heats the resin particles, melts them and plasticates the copolymer into a blended melt and then pumps this melted copolymer material into a spiral die. The molten polymer is then pulled and formed into a circumferential hollow thin film stalk around an enclosed gas pocket or gas pressurized volume. The cooling of the molten polymer film which occurs just exit of the circular thin slit die opening and in drawing it over this enclosed gas volume provides sufficient strength to the polymer mass to pull and form or draw a hollow thin film stalk. This cylindrical thin film with the enclosed gas volume is at some point, collapsed between two counter rotating rolls pressing the cylindrical film together forming a two layer sandwich referred to as a layflat. The layflat is typically cut or slit on its edges forming 2 plies of film which are still layered together. The 2 film plies of the layflat are usually separated into individual films and rolled onto a turning core forming a roll of film. (This invention allows improved cutting and separation of the 2 film layer layflat for EVA films with VA levels of 10 40%—due to its fast bloom and fast surface enhancing effects of reducing tackiness, sticking and COF (coefficient of friction).

Variants to this process include not slitting or separating the film layflat in the film forming process. If the circular die opening is horizontal (versus vertical in typical "film blowing" processing), the molten polymer forming into a film is sometimes referred to as profile or tubing extrusion.

Coating Operations

The vinyl acetate and ethylene copolymer resin, either containing the N,N'ethylene bis oleamide or mixed with pellets containing the N,N'ethylene bis oleamide component, is conveyed to the feedthroat of an extruder. The extruder heats the resin particles, melts them and plasticates the copolymer into a blended melt and then pumps this melted copolymer material into a coating die. The coating die distributes the molten polymer uniformly to a thin straight slit opening. Molten polymer flowing from the thin straight slit die forms a curtain or web which can coat a substrate moving beneath the slit opening. Just after the web contacts the moving substrate, the molten polymer is cooled by nipping, pressing or contacting the coating against a cool roll. The coated substrate is usually cut to a desired width and rolled onto a core. With higher VA EVA copolymer coating resins, the coating can stick to the cooling roll just after the molten polymer is dropped onto the moving substrate resulting in processing problems such as tearing the substrate and wrapping around the cooling roll. This invention facilitates using higher VA EVA copolymers due to the faster blooming effect of the slip and enhanced release properties that occur in the short time span prior to contacting the cooling roll.

EXAMPLES

The following examples provide exemplary support for the claimed invention and should not be construed as limiting the claimed subject matter. The examples below clearly demonstrate that the olefinic additive and resultant ethylene copolymeric composition has good film forming and processing properties even at significant vinyl acetate percentages (e.g. greater than about 10% and preferably greater than about 18%) and the additive greatly enhances the slip characteristics of ethylene vinyl acetate films which makes these films easier to handle and process and allows the film to run faster on film forming equipment. As demonstrated below, the films containing the olefinic additive and, for example, EVA can be made as single layer or a multilayer films (coextruded or laminated).

Example 1

A coextrusion was conducted of mostly two-layer films of SURLYN® 8240, a 2.8 MI sodium ionomer having a melting point of 90° C., a product available from DuPont and a blend of ELVAX® 3182, a 3 MI ethylene-vinyl acetate resin having a vinyl acetate content of 28 wt. %, and XEP 23. XEP 23 is a concentrate composed of 95 wt. % of ELVAX® 3182, 2 wt. % N,N'-ethylene-bis-oleamide (#5), and 3 wt. % silica (in the form of diatomaceous earth). The EVA resin layer was made up of 75 wt. % of the 3182 resin and 25 wt. % of the XEP 23 resin. The use level of the N,N'-ethylene-bis-oleamide was thus 0.5 wt. % or 5,000 ppm of the additive in the resin, and the amount of silica was 7,500 ppm.

These coextrusions were carried out on a 2.5" (63.5 mm) WELEX blown film extrusion line extruding the EVA layer, and a 1.5" (38.1 mm) Davis extruder was used for the ionomer layer. The thickness of the EVA containing layer may range from 0.8 mil to 8 mil (0.2–2 mm). The temperature profiles for the two extruders were as shown below:

| Extruder | Rear | Ctr. Rear | Center | Ctr. Frt. | Front | Head | Adap. | Die |
|---|---|---|---|---|---|---|---|---|
| Welex | 300 | 350 | 375 | 380 | 380 | 380 | 380 | 380 |
| Davis | 375 | 390 | 390 | 390 | 380 | 380 | 380 | 380 |

The films produced ranged in total thickness between 4.02 and 5.07 mils (1–1.25 mm), and the percentages of the outside ionomer layer thickness ranged from 19.6 to 48.6% of the total. All of the samples were prepared at a blow-up ratio of approximately 1.75:1 using an 810" diameter Gloucester die. The film take-off rate ranged from 15 to 47 feet/min (4.6–14.3 met/min). Chilled air of approximately 50° F. (10° C.) temperature was fed to the air ring at a rate of 30 to 59 cu. ft./min (0.85–1.7 cu m/min). The tubular film from these extrusions could be readily opened by the time it reached the slitter-rewinder.

Example 2

A concentrate was made containing 5.0 wt. % N,N'-ethylene-bis-oleamide #5, 7.5 wt. % "Superfloss" silica, with the remainder being the carrier resin ELVAX® 3182 to form "VAX CE9746". The concentration of the additives was selected so that 10 wt. % of the concentrate could to added to 90 wt. % of the EVA resin, the additive concentrations being 2.5× of those in XEP 23 in Example 1 above. Three coextruded films were produced from the compositions described below. Number 1 film was 1.2 mils (0.03 mm) ionomer recipe outside and 4.8 mils (0.12 mm) EVA recipe inside. Number 2 film was 2.5 mils (0.06 mm) ionomer recipe outside and 2.5 mils (0.06 mm) EVA recipe inside. Number 3 film was 2.5 mils (0.06 mm) ionomer Recipe outside and 2.5 mils (0.06 mm) ionomer recipe inside (COMPARATIVE).

The composition of the ionomer recipe used for the above layers was:
  93 wt. % SURLYN® 8240; 2.0 wt. % CONPOL 13B (12.5 wt. % "Superfloss" Silica in 9 wt. % methacrylic acid (MAA)-content EMAA resin, 10 MI; antiblock concentrate); and 5 wt. % "Ampacet" 11200 (Commercial White Concentrate of 70 wt. % TiO2 in ethylene-methyl acrylate copolymer carrier).

The composition of the EVA formulation used in the three films was:
  85.5 wt. % ELVAX® 3182; 10.0 wt. % VAX CE9746 Slip/Antiblock Concentrate; and 4.5 wt. % "Ampacet" 11200 White Concentrate.

The two coextruded films having an outside layer of ionomer formulation and an inside layer of EVA formulation were successfully coextruded into gusseted film tubing. The face dimension of the tubing was 16.5" in width (419 mm), and each gusset was 5.5" (140 mm) deep. Samples of the tubing taken on arrival at the wind-up position of the film extruder could be readily opened, showing the effectiveness of the N,N'-ethylene-bis-oleamide at the use level of 5,000 ppm. The EVA resin has a much greater tendency to block and self-adhere, unlike the ionomer resin that requires only silica antiblock to give openability of the gusseted tubing.

Example 3

Five-layer film coextrusions were also conducted as described herein. A Comparative concentrate additive composition and a concentrate formulation of the invention were prepared and compared for film-forming effectiveness and capability. The five layer film comprised a center layer of a blend of 80 wt. % ethylene-vinyl alcohol copolymer and 20 wt. % of ELVAX® 3182. On each side of the center layer was a layer of an adhesive resin; and the outermost layers were composed of an ultralow density linear low density polyethylene (ULDPE) composition containing ELVAX®, a color concentrate, and either a Comparative formulation (i.e., without alkylene oleamide) or the film-forming composition of the invention. The Comparative resin blend for the outermost layer was made up of ULDPE29.27 (30 wt. %); ELVAX® 3182 (51.2%); SB#1 (a composition of 20 wt. % silica, 3.5 wt. % stearamide, and 3.5 wt. % erucamide in a carrier resin of an 18 wt. % vinyl acetate content EVA resin having an MI of 2.5 g/10 min (ELVAX® 3170) which gave 19,000 ppm of silica in the layer and 6,832 ppm of combined amides as slip additive); and color concentrate (9.8%).

The composition of the invention which includes the additive alkylene bisoleamides includes or consists essentially of SB#2 (a composition comprising 5 wt. % N,N'-ethylene bis oleamide, 7.5 wt. % "Superfloss" silica with the remainder being ELVAX® 3182). This concentrate was present in the outer layer formulation at 10 wt. %; color concentrate (7.5%); ELVAX® 3182 (52.5%); and ULDPE (30%). Thus the outer layers contained 7,500 ppm silica and 5,000 ppm N,N'-ethylene bisoleamide.

The films were prepared using standard film processing and manufacturing techniques for five layer films of this nature and under the same extrusion conditions. The laid flat film tubing from the comparative five layer film containing SB#1 could not be opened by the time it reached the wind-up. In contrast, the film tubing containing SB#2 concentrate which actually had lesser amounts of both the silica antiblock and the amide(s), could be opened readily.

The above examples demonstrate that the production of high VA content EVA films can be accomplished without impairment of physical properties by incorporating an alkylene bisoleamide of the invention into the film-forming composition. This additive can also be added to any ethylene vinyl acetate copolymer resin grade used to produce film in place of other slip additives and at lower concentrations. The enhanced migration properties of the bisoleamides in and onto film surfaces also enhances slip properties. The film-forming enhancing additive of the invention is particularly suitable for high VA content ethylene vinyl acetate resins used to produce film which traditionally have high coefficients of friction (COF); tackiness and blocking properties which discourages the use of these resins in film production. The tacking and blocking tendencies are reduced by the addition of the recited additive which permits faster bloom rates and therefore improves and allows or enables film processing and production of these high VA content copolymeric resins. The inventors also noticed that use of the invention reduced nip roll and winding blocking tendencies and improved knife-razor performance in the conversion to film. Comparative experiments conducted at 18% VA and at 25% VA in an ethylene vinyl acetate copolymer with similar weight loading of ADVAWAX 240 (N,N'-ethylene bisoleamide) versus ecruamide showed that the former excipient enhanced film forming properties of the high VA copolymers and compared more favorably to the comparative amide. Bubble stability increased; razor slitting improved (smoother and cleaner); less problem occurred in separating the web layflat-25%VA content EVA film with comparative amide could not be separated while the run containing ADVAWAX 240 could be separated. These favorable results occurred even at 50% concentration levels relative to the amide.

What is claimed is:

1. A film comprising at least two layers, including (1) a first layer consisting essentially of an ionomeric resin and (2) a second layer consisting essentially of (a) an ethylene vinyl acetate copolymer and (b) an alkylene bisoleamide of the formula: R—C(O)—NHC$_2$H$_4$NHC(O)—R wherein R is a C$_4$–C$_{25}$ saturated or unsaturated hydrocarbon, and wherein the bisoleamide is present in an amount of from about 2000 to about 5000 ppm.

2. The film of claim 1 wherein the ethylene vinyl acetate layer has a vinyl acetate content of grater than about 10 wt %.

3. The film of claim 2 wherein the ethylene vinyl acetate layer has a vinyl acetate content of from about 10 wt % to about 40 wt %.

4. The film of claim 3 wherein the ethylene vinyl acetate layer has a vinyl acetate content of from about 15 wt % to about 40 wt %.

5. The film of claim 4 wherein the vinyl acetate layer has a vinyl acetate content of from about 15 wt % to about 33 wt %.

6. The film of claim 5 wherein the alkylene bisoleamide is selected from the group consisting of: N,N'-ethylenebisoleamide, N,N'-ethylenebiserucamide, N,N'-diolelyladipamide, and N,N'-dierucyladipamide.

7. The film of claim 6 wherein the alkylene bisoleamide is N,N'-ethylenebisoleamide.

8. A process for producing a multi-layer film of claim 1 comprising the steps: (i) mixing an alkylene bisoleamide of claim 1 with an ethylene vinyl acetate (EVA) copolymer and (ii) co-extruding the blown film obtained from the EVA copolymer/bisoleamide mixture with at least one layer of an ionomeric resin to obtain the multi-layer film.

9. A process for producing a multi-layer film of claim 1 comprising the steps: (i) mixing an alkylene bisoleamide of claim 1 with an ethylene vinyl acetate (EVA) copolymer (ii) extruding the ethylene vinyl acetate/bisoleamide mixture (iii) blowing the extruded ethylene vinyl acetate mixture to obtain a blown film and (iv) laminating or coating the blown film obtained from the EVA copolymer/bisoleamide mixture with at least one layer of an ionomeric resin to obtain the multi-layer film.

10. The process of claim 9 wherein the ionomeric resin layer is coated onto the ethylene vinyl acetate blown film layer.

* * * * *